Patented Apr. 28, 1942

2,280,994

UNITED STATES PATENT OFFICE 2,280,994

MUD DISPERSION

Robert B. Booth, Springdale, Conn., assignor to American Cyanamid Company, New York, N. Y., a corporation of Maine No Drawing. Application May 31, 1940, Serial No. 338,050

20 Claims. (Cl. 252—8.5)

This invention relates to a method for controlling the viscosity characteristics of aqueous mud or clay dispersions. Dispersions of this type are used in the ceramics industry, where they are known as clay slips, and in the preparation of paper sizes, but their largest commercial use is probably found in the drilling of oil wells.

In the drilling of oil wells and other deep wells by rotary drilling processes it is now the practice to recirculate a fluid called "drilling mud" downwardly through the hollow drill pipe, across the face of the drill bit, and upwardly through the drill hole. The drilling mud serves to cool and lubricate the drill bit, to raise the drilling cuttings to the surface of the ground and to seal the sides of the well to prevent loss of water and drilling fluids into the formation through which the drill hole is being bored. After each passage through the well the mud is passed through a settling tank or trough, wherein the sand and drill cuttings are separated with or without screening after which the fluid is again pumped into the drill pipe by a mud pump.

A satisfactory drilling mud must possess certain definite characteristics. It must have sufficient fluidity to permit pumping at the proper rate without excessive power requirements and must be sufficiently thixotropic in character to prevent the settling of sand and cuttings in the well when the circulation is stopped temporarily for exchanging bits, fishing for tools or for other purposes. The two most important properties of rotary drilling muds are the property of density and the property of viscosity and shearing strength, which last property is controlled by the colloidal dispersion of the mud and its graduation of particle size. Viscosity and dispersion are usually considered simultaneously with density, the problem being to obtain adequate density, low viscosity and a permanent suspension of clay solids capable of supporting sand and cuttings within the well but which will release the sand and cuttings outside the well.

The viscosity in thixotropic mud may be measured by the Marsh funnel viscosimeter and the results are expressed as the number of seconds for a given volume to flow through an orifice of predetermined size. In muds of this character the measured viscosity depends to a considerable extent on movement or on the elapsed time since movement has ceased, as one of the chief contributing factors to this viscosity is the tendency of the mud to form a gel upon standing. This property of thixotropy or gelation upon standing has been described as resulting from the presence of a shell of surface hydration surrounding each clay particle and separating it from other clay particles similarly hydrated. The normal forces of attraction between the particles are opposed by forces of repulsion existing by virtue of these shells of surface hydration, with the result that relative movement between the clay particles is hindered and the mud has a high structural viscosity.

I have now discovered that the normal structural viscosity of drilling muds and similar mud dispersions can be modified to a more advantageous value by the incorporation therein of a material of the group consisting of urea, thiourea, substituted ureas and substituted thioureas. Urea is an organic nitrogen compound of the formula $(NH_2)_2CO$. Thiourea is its sulfur analog and has the formula $(NH_2)_2CS$. Substituted ureas and thioureas are compounds in which at least one of the amido groups carries a substituent such as alkyl, alkylene, aryl and the like. Typical compounds of this class that can be used in practicing the invention are urea itself, thiourea, methyl, ethyl, propyl, butyl and higher monoalkyl ureas and thioureas; the corresponding dialkyl ureas including mixed alkyl ureas and thioureas; water-soluble urea-aldehyde condensation products such as methylene urea, the methylol ureas, and the corresponding thiourea derivatives. The aryl ureas are represented by phenyl urea, phenyl thiourea and the corresponding alkyl-phenyl ureas and thioureas. Compounds such as biuret in which the substituent is another urea or thiourea group, are also included. All the compounds of this class are substantially neutral, water-soluble substances that have no corrosive action on metal and can be used in high concentrations without damaging in any way the metal of the well casing or drilling machinery. In the following claims the compounds of the above-designated class will be defined as urea compounds, it being understood that this term is intended to include those compounds ordinarily designated as thioureas, as well as the compounds designated as ureas in textbooks of organic chemistry.

Although urea, thiourea, and substituted ureas and thioureas can be used as the sole viscosity reducing agent for clay slips, drilling muds and other mud or clay dispersions, they possess even more remarkable characteristics when used in admixture with or as a supplement to other viscosity reducing agents. One of their most important characteristics, either when used alone or in admixture with other agents, is their property of maintaining the viscosity of mud fluids at a minimum value irrespective of the addition of further amounts of conditioning agents. This is particularly important in oil well drilling, for it is customary to condition the mud initially and also to add further amounts of conditioning agent to the mud as the drilling proceeds in order to offset the flocculating action of high temperatures and inorganic salts dissolved from the formation. When many of the known deflocculating agents are used, such as for example the water-soluble salts of polyphosphoric acids, the increasing concentration of treating agent that results from this practice soon begins to reflocculate or thicken the mud so that its final viscosity may be as high as or even higher than the original value of the untreated mud dispersion. I have found, and have demonstrated by the figures shown in the following examples, that the admixture of one of the urea compounds with a viscosity reducing agent of this type will overcome to a considerable extent its tendency to reflocculate the mud at high concentrations, so that the viscosity of the mud remains at a lowered value during the entire drilling operation. This is one of the most important advantages of my invention.

The urea compounds of my invention may be added to clay slips, paper sizes, drilling muds, or other mud or clay dispersions in any suitable quantities. These muds and clays are obtained from the most varied sources; in oil well drilling they are sometimes found in the well itself, at other times they are dug from neighboring deposits, while in many cases they may be compounded from mixtures of natural clays with added gel-forming materials such as bentonite, and added weighting materials such as barytes. As has been explained, the urea compounds are preferably used in admixture with or as a supplement to other conditioning or viscosity reducing agents, and any known or approved mud deflocculating agent may be employed in conjunction therewith. Suitable deflocculating agents of this class that may be used in admixture with urea, thiourea and their derivatives are, for example, the water-soluble salts of polyphosphoric acids such as sodium tetraphosphate, tetrasodium pyrophosphate; the water-soluble salts of metaphosphoric acid such as sodium metaphosphate, sodium hexa metaphosphate and the like; sodium silicate, the corresponding potassium salts, tannic acid, humic acid, lignic acid, pyrogallic acid, waste sulfite liquor, soda black liquor or extract solutions or dispersions of the sap brown type, tannins and the like and the dicyandiamide described and claimed in my copending application, Serial No. 338,241, filed May 31, 1940.

A class of deflocculating agents that may be used with special advantage in admixture with urea, thiourea, substituted urea and substituted thiourea in the treatment of drilling muds are the "saturated" alkali metal polyphosphates in which all the acid groups are neutralized or saturated with metallic or positive ions and in which the ratio of metal oxide ($Me_2O$) to $P_2O_5$ is greater than 1:1 but less than 2:1. This definition includes all the saturated alkali metal polyphosphates of the empirical formula $$Me_{n+2}P_nO_{3n+1}$$

in which Me is an alkali metal and $n$ is an integer greater than 2, and particularly a number of polyphosphate compositions obtained by fusion processes. The definition also includes mixed alkali metal polyphosphates as well as mixtures of two or more alkali metal polyphosphates of different chemical constitution. Typical phosphates of this class are saturated sodium and potassium triphosphates, in which the $Me_2O$ to $P_2O_5$ ratio is 5:3 and the alkali metal polyphosphates or phosphate mixtures prepared by fusing alkali metal ortho and pyrophosphates with phosphorous pentoxide in the proper proportions as described in the copending application of C. F. Bonnet and R. B. Booth, Serial No. 331,418, filed April 24, 1940. Other alkali metal polyphosphates falling within this definition are sodium and potassium hexaphosphate, sodium and potassium heptaphosphates $Me_9P_7O_{22}$, and sodium and potassium octaphosphates $Me_{10}P_8O_{25}$, as well as the corresponding mixed phosphates containing both sodium and potassium or other atoms or groups included within the class of alkali metals forming stable complex phosphates. It will be noted that the above definition also includes sodium and potassium tetraphosphate, in which the ratio of $Me_2O$ to $P_2O_5$ is 3:2.

The invention in its broader aspects is not limited by the method used in incorporating the urea compound with the mud or clay dispersion, and any suitable method of incorporation may be used. In well drilling one method that has been employed with success is to mix a solution of the urea or thiourea compound, which may or may not contain other viscosity reducing agents as noted above, with the mud as it comes out of the well to facilitate the screening or settling out of sand and cuttings. In other cases the composition may be added just ahead of the mud pump so that the pumping operation will insure a thorough mixing. Still another method is to introduce a solution of the composition into the mechanical de-gelling mechanism, and other methods may be resorted to if desired. However, it should be noted that the remarkable property of urea, thiourea and their derivatives in deflocculating a mud fluid that has already been thickened by the addition of excessive amounts of other viscosity reducing agents renders these materials of especial value as addition agents to mud fluids that have already been used for some time, and in many cases the compounds may not be added until after the first few days of a drilling operation employing fresh drilling mud and other deflocculating agents.

In ordinary drilling practice the mud conditioning agents are added in amounts less than 0.4 pound per 42 gallon barrel of mud, and quantities of 1 pound per barrel are seldom exceeded in any single treatment. However, as continuous or intermittent additions may take place over considerable periods of time it is impossible to define the proper concentration in terms of the quantities added and this must be determined in the field. It should be understood, therefore, that the present invention includes the addition to mud or clay dispersions of urea, thiourea, their substitution products and compositions containing them in any amounts which, in the judgment of the operator, will give the proper viscosity that may be desired for the purpose in mind.

The invention will be illustrated in greater detail by the following specific examples. It should be understood, however, that although these examples may describe in detail some of the more specific aspects of the invention they are given primarily for the purposes of illustration and the invention in its broadest aspects is not limited thereto.

EXAMPLE 1

A drilling mud dispersion having a specific gravity of 1.32 was made from McKittrick clay, which is found in California and widely used in oil well drilling. Viscosity determinations were made on this clay dispersion using the Marsh funnel viscosimeter at 500/500 cc. The procedure was as follows:

A solution of 0.4 gram of the deflocculating or viscosity reducing agent in 7 cc. of water is added to 700 cc. of the mud dispersion which is then stirred for 3 minutes with a high speed mechanical agitator and immediately poured through a sieve into the funnel viscosimeter. The viscosity is expressed as the number of seconds required for the funnel to discharge.

The second and third additions of the treating agent are also made as aqueous solutions of the above concentration, thus diluting the original 700 cc. of mud with about 28 cc. of water. It has been found that this is the amount of water to approximate field conditions. In all further additions the dry reagent is used and the mixture is stirred for 5 minutes to insure a uniform incorporation.

In this manner the cumulative effect of continuous additions of the mud-treating agent is observed. The results obtained by adding urea and substituted ureas and mixtures of these compounds with other viscosity reducing agents is shown in the following table. In the headings of the tables of this and the following examples dicy means dicyandiamide, TSPP means anhydrous tetrasodium pyrophosphate Na$_4$P$_2$O$_7$ and STP means anhydrous sodium tetraphosphate Na$_6$P$_4$O$_{13}$.

showed that there was no significant difference in wall building characteristics between the mud containing the treating agents and untreated mud.

EXAMPLE 2

In order to demonstrate the value of urea for thinning or deflocculating mud dispersions that have become thickened by the cumulative addition of excessive amounts of other treating agents a sample of the mud described in Example 1 was first treated with tetrasodium pyrophosphate until the viscosity was greater than the initial value and then successive additions of urea were made and the resulting viscosities determined. The procedure followed was the same as that described in Example 1. The results were as follows:

TABLE 2

*Mud thickened with TSPP; then treated with urea*

| TSPP | | Urea | |
|---|---|---|---|
| Lbs./bbl. (cumulative) | Viscosity (500/500) | Lbs./bbl. (cumulative) | Viscosity (500/500) |
| Start | 59.9 | Start | 60.6 |
| 0.2 | 32.6 | 0.5 | 56.2 |
| 0.4 | 30.7 | 1.0 | 46.6 |
| 0.8 | 28.1 | 1.5 | 41.3 |
| 1.3 | 27.5 | 2.0 | 38.0 |
| 1.8 | 26.7 | 2.5 | 35.4 |
| 2.3 | 26.5 | 3.0 | 33.1 |
| 3.3 | 26.2 | 3.5 | 31.1 |
| 5.8 | 27.4 | | |
| 8.3 | 35.1 | | |
| 10.8 | 60.6 | | |

TABLE 1

*Marsh funnel viscosity—seconds (500/500)*

| Lbs./bbl. cumulative | Control, no re-agent | STP | TSPP | Urea | 85% urea 15% TSPP | 75% urea 25% TSPP | 25% urea 75% TSPP | 75% urea 25% STP | 25% urea 75% STP | Butyl urea | 75% butyl-urea 25% TSPP | Biuret |
|---|---|---|---|---|---|---|---|---|---|---|---|---|
| Start | 62.4 | 65.0 | 65.0 | 59.3 | 64.7 | 64.0 | 60.7 | 60.5 | 60.2 | 60.0 | 63.0 | 62.1 |
| 0.2 | 57.5 | 39.0 | 34.3 | 58.1 | 46.9 | 39.2 | 33.2 | 45.2 | 40.1 | 53.1 | 40.2 | 56.3 |
| 0.4 | 53.1 | 33.2 | 31.1 | 51.4 | 37.0 | 32.2 | 30.4 | 39.0 | 33.5 | 50.3 | 32.9 | 52.6 |
| 0.8 | 47.9 | 29.7 | 28.9 | 45.8 | 31.7 | 29.2 | 28.2 | 32.1 | 29.8 | 45.5 | 29.5 | 47.2 |
| 1.3 | 47.5 | 28.4 | 27.4 | 45.0 | 30.4 | 28.9 | 27.6 | 29.5 | 28.3 | 45.1 | 28.7 | 46.4 |
| 1.8 | 48.1 | 27.5 | 27.1 | 43.9 | 29.6 | 28.5 | 26.5 | 28.0 | 27.6 | 45.0 | 28.4 | 45.6 |
| 2.3 | 47.9 | 27.1 | 26.7 | 42.5 | 28.9 | 27.6 | 26.4 | 28.0 | 27.3 | 48.0 | 27.8 | 46.1 |
| 3.3 | 49.4 | 26.7 | 26.1 | 41.6 | 28.5 | 27.2 | 25.8 | 27.1 | 26.5 | 48.8 | 27.2 | 46.0 |
| 5.8 | 48.9 | 26.3 | 27.9 | 41.4 | 28.0 | 26.6 | 26.1 | 25.9 | 26.0 | 48.9 | 26.3 | 47.3 |
| 8.3 | 46.9 | 26.8 | 35.6 | 38.4 | 27.6 | 26.4 | 27.3 | 26.0 | 25.9 | 44.6 | 26.3 | 50.3 |
| 10.8 | 47.7 | 29.9 | 62.1 | 38.4 | 26.8 | 26.3 | 31.3 | 26.0 | 26.3 | 43.0 | 25.9 | 54.3 |
| 13.3 | 47.4 | 39.5 | 85.0 | 35.4 | 26.6 | 25.7 | 38.9 | 25.3 | 26.5 | 42.6 | 25.7 | 57.0 |
| 18.3 | 46.9 | 73.7 | | 33.9 | 26.2 | 25.4 | 53.5 | 25.2 | 29.7 | 41.6 | 27.4 | |
| 23.3 | 46.4 | | | 32.4 | 25.5 | 25.6 | 58.6 | 24.7 | 35.2 | 42.2 | | |
| 28.3 | 46.8 | | | 31.4 | 25.5 | 25.7 | | 25.3 | 41.3 | 43.3 | | |
| 33.3 | 48.5 | | | 30.6 | 25.4 | 25.8 | | 24.4 | 43.5 | 48.9 | | |
| 38.3 | | | | 29.5 | 25.1 | 25.9 | | 24.5 | 44.1 | 58.0 | | |
| 43.3 | | | | 28.9 | 25.1 | 26.0 | | 24.9 | | 72.0 | | |
| 48.3 | | | | 28.5 | 25.0 | 25.9 | | 24.8 | | | | |
| 53.3 | | | | 27.4 | 25.0 | 26.0 | | 24.5 | | | | |
| 58.3 | | | | | | 25.9 | | 24.4 | | | | |
| 63.3 | | | | | | 25.9 | | 24.4 | | | | |
| 68.3 | | | | | | 26.0 | | 24.5 | | | | |
| 73.3 | | | | | | 25.9 | | 24.3 | | | | |
| 78.3 | | | | | | 25.6 | | 24.4 | | | | |
| 83.3 | | | | | | 25.9 | | 24.3 | | | | |
| 88.3 | | | | | | 25.9 | | 24.6 | | | | |

Water loss tests were also made on the materials listed in the above table, using 0.8 pound per barrel of the viscosity reducing agent. The tests were made on the standard 100 pound wall-building tester, which consists of a 3 inch closed pressure filter connected with a compressed nitrogen tank and provided with a graduate for measuring the volume of filtrate. The results

EXAMPLE 3

Thiourea and substituted thioureas such as monophenyl thiourea, guanylthiourea and the like may be used instead of or in admixture with the urea and urea derivatives described in the preceding examples. Typical results obtained by the procedure outline in Example 1, using the materials and quantities listed, are shown in the following table. The control figures listed in Example 1 are reproduced for purposes of comparison.

TABLE 3

*Marsh funnel viscosity—seconds (500/500)*

| Lbs./bbl. cumulative | Control, no-reagent | Thiourea | Guanyl-thiourea | 75% thiourea 25% TSPP | 25% thiourea 75% TSPP | 75% thiourea 25% STP | 25% thiourea 75% STP | Mono-phenyl-thiourea |
|---|---|---|---|---|---|---|---|---|
| Start | 62.4 | 63.6 | 56.1 | 60.7 | 61.0 | 64.6 | 58.1 | 62.5 |
| 0.2 | 57.5 | 59.3 | 52.4 | 38.7 | 32.7 | 47.0 | 38.3 | 57.1 |
| 0.4 | 53.1 | 53.8 | 50.4 | 33.3 | 30.4 | 39.2 | 32.1 | 52.8 |
| 0.8 | 47.9 | 48.2 | 44.0 | 29.8 | 27.9 | 32.2 | 28.8 | 47.6 |
| 1.3 | 47.5 | 49.4 | 44.2 | 29.4 | 27.4 | 30.1 | 27.5 | 45.9 |
| 1.8 | 48.1 | 46.5 | 44.8 | 28.7 | 26.7 | 28.4 | 27.1 | 46.5 |
| 2.3 | 47.9 | 46.1 | 43.4 | 28.3 | 26.1 | 27.7 | 26.5 | 46.6 |
| 3.3 | 49.4 | 46.0 | 43.2 | 27.3 | 25.9 | 26.9 | 26.3 | 46.4 |
| 5.8 | 48.9 | 41.7 | 41.5 | 26.4 | 26.3 | 26.1 | 25.9 | 47.4 |
| 8.3 | 46.9 | 40.2 | 39.9 | 26.2 | 27.5 | 25.7 | 26.1 | 48.8 |
| 10.8 | 47.7 | 39.5 | 38.4 | 25.8 | 32.1 | 25.3 | 26.5 | 49.2 |
| 13.3 | 47.4 | 37.0 | 37.2 | 25.8 | 41.2 | 25.5 | 28.3 | 49.0 |
| 18.3 | 46.9 | 35.6 | 36.0 | 25.6 | 59.0 | 25.1 | 34.9 | 53.6 |
| 23.3 | 46.4 | 32.8 | 34.9 | 25.4 | 71.0 | 24.6 | 43.8 | 54.7 |
| 28.3 | 46.8 | 32.1 | 35.7 | 25.6 | | 24.8 | 50.5 | |
| 33.3 | 48.5 | 31.4 | | 25.6 | | 24.6 | 55.1 | |
| 38.3 | | 30.7 | | 26.3 | | 24.4 | 56.3 | |
| 43.3 | | 30.6 | | 26.6 | | 24.4 | 57.0 | |
| 48.3 | | | | 26.6 | | 24.1 | | |
| 53.3 | | | | 27.2 | | 24.5 | | |
| 58.3 | | | | 27.9 | | 24.2 | | |
| 63.3 | | | | 30.1 | | 24.2 | | |
| 68.3 | | | | 30.2 | | 24.3 | | |
| 73.3 | | | | 30.6 | | 24.7 | | |
| 78.3 | | | | 31.5 | | 24.5 | | |
| 83.3 | | | | | | 24.7 | | |
| 88.3 | | | | | | 25.1 | | |

While the foregoing invention has been illustrated in greatest detail with reference to mud dispersions of the type used in drilling oil wells, to which it is particularly applicable, it is evident that the principles thereof can also be applied to other mud and clay dispersions such as those referred to above. It should be understood, therefore, that the term "mud dispersions" as used in the following claims is intended to include both drilling muds, clay dispersions such as are used in ceramics and in the preparation of paper sizes, and in general any aqueous dispersion of finely divided earthy material that may require chemical deflocculation.

What I claim is:

1. A method of controlling the viscosity of aqueous clay dispersions which comprises admixing therewith a urea compound.

2. A method of controlling the viscosity of aqueous drilling muds which comprises admixing therewith a urea compound.

3. A method of controlling the viscosity of aqueous drilling muds which comprises admixing therewith a urea compound and also adding another viscosity reducing agent.

4. A method of controlling the viscosity of aqueous drilling muds which comprises adding thereto a viscosity reducing agent having the property of rethickening the mud and also adding a urea compound.

5. A method of reducing the viscosity of aqueous clay dispersions which comprises adding thereto a water-soluble salt of a polyphosphoric acid capable of reducing the viscosity thereof and also adding a urea compound.

6. A method of reducing the viscosity of aqueous clay dispersions which comprises adding thereto a saturated alkali metal polyphosphate having a ratio of alkali metal oxide to $P_2O_5$ greater than 1:1 and less than 2:1 and also adding a urea compound.

7. A method of reducing the viscosity of aqueous clay dispersions which comprises adding thereto a compound of the formula $$Me_{n+2}P_nO_{3n+1}$$

in which Me is an alkali metal and $n$ is an integer greater than 2, and also adding a urea compound.

8. A method of controlling the viscosity of aqueous clay dispersions which comprises admixing urea therewith.

9. A method of controlling the viscosity of aqueous clay dispersions which comprises admixing thiourea therewith.

10. A method of controlling the viscosity of aqueous drilling muds which comprises admixing urea therewith.

11. A method of controlling the viscosity of aqueous drilling muds which comprises admixing thiourea therewith.

12. An aqueous clay dispersion containing a urea compound.

13. A drilling fluid comprising an aqueous thixotropic clay dispersion and a urea compound.

14. An aqueous clay dispersion containing a viscosity reducing agent having the property of rethickening the mud and also containing a urea compound.

15. An aqueous clay dispersion containing a water soluble salt of a polyphosphoric acid capable of reducing the viscosity thereof and also a urea compound.

16. An aqueous clay dispersion containing a saturated alkali metal polyphosphate having a ratio of alkali metal oxide to $P_2O_5$ greater than 1:1 and less than 2:1 and also containing a urea compound.

17. An aqueous clay dispersion containing a compound of the formula $$Me_{n+2}P_nO_{3n+1}$$

in which Me is an alkali metal and $n$ is an integer greater than 2 and also containing a urea compound.

18. An aqueous clay dispersion containing urea.

19. A drilling fluid comprising an aqueous thixotropic clay dispersion and urea.

20. A drilling fluid comprising an aqueous thixotropic clay dispersion and thiourea.

ROBERT B. BOOTH.